United States Patent Office 3,195,996
Patented July 20, 1965

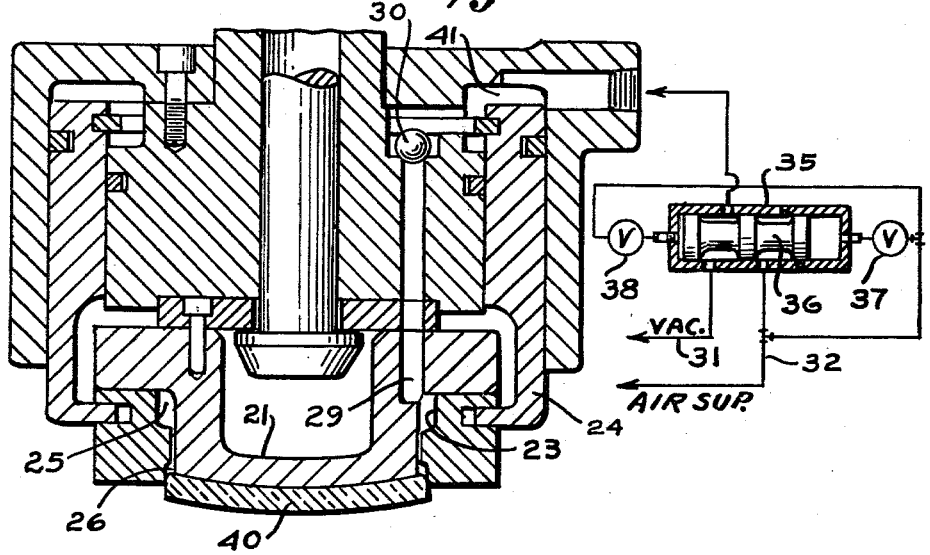
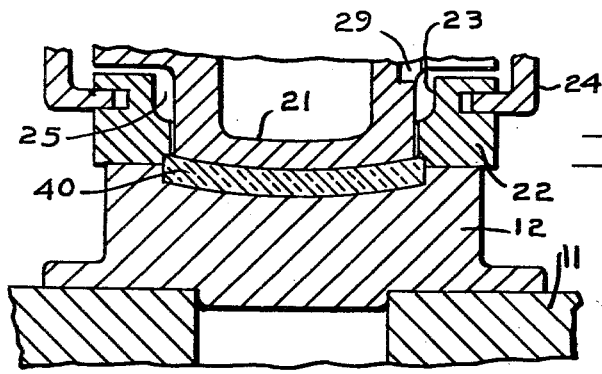

3,195,996
GLASS PRESSING PLUNGER AND METHOD
OF ITS USE
Donald J. Tingley, Corning, N.Y., assignor to Corning
Glass Works, Corning, N.Y., a corporation of New
York
Filed Apr. 11, 1962, Ser. No. 186,776
7 Claims. (Cl. 65—106)

The present invention relates to the pressing of moldable materials in press molds and to a pressing plunger therefor.

Articles formed in press molds are usually removed therefrom either by seizing the article with a readily available vacuum chuck or by elevating the article by a valve in the mold bottom to make the article available for removal from the mold by a mechanical take-out device.

According to the present invention the pressing plunger has embodied about it a ring which performs the usual function of arresting the upward flow of the glass at the top bordering edge of the mold to form the upper border of the finished article, and in addition is cooperative with the plunger to provide a cavity thereabout having an annular entrance closed by an article pressed in the cooperative mold whereby by connection of a source of negative pressure to such cavity the pressed article can be held in engagement with the plunger during its withdrawal from association with the mold. By the subsequent utilization of positive pressure the ring is lowered with respect to the plunger to strip the article therefrom.

For a more compresensive description of the invention reference is made to the accompanying sheet of drawing, wherein FIG. 1 shows, in sectional elevation, a plunger and ring assembly embodying the invention holding an article that has been withdrawn by it from a press mold, and a piping diagram for such assembly; and FIG. 2 of which shows, in sectional elevation, the lower portion of such assembly in association with a mold containing an article pressed therein by the assembly.

Referring to the drawing in detail the numeral 11 designates a support upon which is arranged a lens blank pressing mold 12.

Vertically aligned over a mold, such as 12, and supported in any convenient fashion (not shown) is a pressing plunger 21 surrounded by a pressing ring 22 suspended from a fluid operated hanger 24 axially movable with respect to the plunger. Ring 22 has a channel 23 formed within its bore to jointly with the surrounded plunger 21 form an annular vacuum chamber or cavity 25 thereabout. Cavity 25 is in communication with a slightly enlarged bore region 26 of ring 22, such enlarged region existing about the surrounded bottom bordering portion of plunger 21 when ring 22 is in its upward position with respect to the plunger, as illustrated in FIG. 1.

A passage 29 in plunger 21 is connectable, via a check valve 30, to chamber 41 above hanger 24, such chamber being connectable to lines 31 and 32 via a conventional form of feed valve 35 whose spool 36 is movable back and forth under control of pilot valves 37 and 38 to alternately place the chamber 41 in communication with lines 31 and 32, and to place passage 29 in communication with line 31 via such chamber and valve 30.

In a blank pressing operation the ring 22, which at the time is in its lowermost position with respect to the plunger 21, engages the mold before entry of the plunger 21 thereinto. As the plunger completes the pressing operation it forces glass within the mold into the enlarged bore region 26 of the ring, as shown in FIG. 2.

After the pressing operation the spool 36 is moved to the position shown, such movement occurring just before the plunger is withdrawn from engagement with the blank. Vacuum is thus created in the space 41 surrounding the upper end of hanger 24 causing such hanger to raise the ring 22 into engagement with the flange of plunger 21, as shown in FIG. 1. Vacuum is at the same time also established in cavity 25 and the enlarged bore region 26 to which the bordering edge of blank 40 is exposed, thereby causing the blank to adhere to the plunger during its retraction from the mold.

The blank 40 may be released onto a suitable support, not shown, by the momentary operation of pilot valve 38 to effect the movement of spool 36 to its rightward position. In such position the vacuum line port of valve 35 is blocked and the air supply line port thereof is placed in communication with the line extending to chamber 41. Positive pressure air supplied to the chamber 41 forces the hanger to its lower position with respect to the plunger 21 causing the ring 22 to strip the lens blank 40 from the plunger.

After another blank is pressed pilot valve 38 is operated to re-establish the vacuum line fluid connection to chamber 41 to elevate the ring to the position shown in FIG. 1 and to create suction in the annular region 26 to enable the newly pressed blank to adhere to the plunger 21 as it is withdrawn from association from the mold 12.

What is claimed is:

1. The combination with an article pressing mold and an article pressing plunger movable into and out of cooperative article pressing relation with such mold in the pressing of a charge of moldable material deposited therein, of means encircling the plunger for providing therewith an annular cavity having an entrance surrounding the plunger closed by an article pressed between it and the mold, said plunger having a passage in communication with said annular cavity connectable to a vacuum source whereby, by connection of such passage to a vacuum line, said means and plunger embody a vacuum chuck for maintaining a pressed article in engagement with the plunger during its movement out of cooperative relation with the mold.

2. A plunger for pressing moldable material to a desired form in a press mold, a ring surrounding the plunger for engagement with the cavity entrance bordering wall of the mold before the plunger reaches its pressing position with respect to the mold, said plunger and ring jointly providing an annular cavity having an entrance surrounding the plunger closed by an article pressed between it and the mold, said plunger having a passage in communication with said annular cavity connectable to a vacuum source whereby said ring and plunger are utilizable as a vacuum chuck by connection of such passage to a vacuum line.

3. A plunger and ring as in claim 2 which embodies means for axially moving said ring with respect to said plunger.

4. A structure as in claim 3 which embodies fluid operated means for effecting such axial movement of the ring.

5. The method which comprises pressing an article in a press mold by arranging a ring over the entrance bordering wall of such mold with its inner boundary projected over the outer margin of such entrance, passing a pressing plunger through such ring into the mold to form an article therein whose upwardly facing boundary region is overlaid by such ring, slightly elevating the ring off such wall to provide an annular cavity over the outer boundary region of the pressed article, connecting a vacuum line into communication with such cavity to adhere the article to the plunger and thereafter withdrawing the plunger from the mold cavity.

6. The method of removal of an article formed in a mold by a pressing plunger and a surrounding ring movable into and out of cooperative relation therewith, which comprises connecting an annular space between such plunger and ring to a negative pressure source whereby the formed article adheres to the plunger during its movement out of cooperative relation with the mold, and thereafter utilizing a positive pressure to move the ring with respect to the plunger to effect release of the article from association with such plunger.

7. The method of removal of an article formed in a mold by a pressing plunger and a surrounding ring movable into and out of cooperative relation therewith, which comprises moving the ring into cooperative relation with the mold in advance of the plunger, moving the ring out of cooperative relation with the mold preceding withdrawal of the plunger from cooperative relation therewith, and connecting an annular space between such plunger and ring to a negative pressure source whereby the formed article adheres to the plunger during its movement out of cooperative relation with the mold.

References Cited by the Examiner
UNITED STATES PATENTS

| | | | |
|---|---|---|---|
| 708,326 | 9/02 | Ebeling | 65—361 X |
| 1,943,483 | 1/34 | Miller | 294—64 X |
| 2,205,261 | 6/40 | Winder | 65—260 X |
| 2,379,830 | 7/45 | Samuelson et al. | 65—362 |
| 2,817,928 | 12/57 | Lambert et al. | 65—106 |

DONALL H. SYLVESTER, *Primary Examiner.*

MORRIS O. WOLK, *Examiner.*